United States Patent
> Piepho

[15] 3,645,586
[45] Feb. 29, 1972

[54] TRACK-ADJUSTING AND RECOIL MECHANISM

[72] Inventor: Donald A. Piepho, Aurora, Ill.
[73] Assignee: Caterpillar Tractor Co., Peoria, Ill.
[22] Filed: July 8, 1970
[21] Appl. No.: 53,177

[52] U.S. Cl. .............................. 305/10, 74/242.14, 89/43, 213/7, 267/35, 305/31
[51] Int. Cl. ....................................................... B62d 55/30
[58] Field of Search ................................... 305/10, 31, 32

[56] References Cited

UNITED STATES PATENTS 3,008,772  11/1961  Helsel, Sr. .................................. 305/10
3,409,335  11/1968  Piepho et al. .............................. 305/10

Primary Examiner—A. Harry Levy
Attorney—Fryer, Tjensvold, Feix, Phillips & Lempio

[57] ABSTRACT

A track-type tractor comprising an endless track entrained about a drive sprocket and an idler has a self-contained adjuster and recoil mechanism operatively connected to the idler to maintain a preset tension on the endless track. The recoil portion of the mechanism comprises a compressible material contained in a housing which yieldably urges the idler wheel in a forward direction. The tension in the track may be easily adjusted through the admission of an incompressible fluid into a variable volume chamber to thereby permit easy adjustment of the track tension to accommodate changing conditions of track wear.

7 Claims, 2 Drawing Figures

Patented Feb. 29, 1972

3,645,586

INVENTOR
DONALD A. PIEPHO

BY
ATTORNEYS

TRACK-ADJUSTING AND RECOIL MECHANISM

BACKGROUND OF THE INVENTION

This invention relates to a track-adjusting or belt-adjusting mechanism and, in particular, to a self-contained track-adjusting and recoil mechanism for use in maintaining a predetermined tension on the endless track of a crawler tractor.

One of the problems encountered with the use of track-type vehicles involves continuously maintaining a predetermined tension in the endless tracks thereof. If, through normal wear the track becomes too loose, the possibility of the track jumping a tooth on a driving and support sprocket or of being thrown off the idler wheel is greatly increased. On the other hand, if the track is overtightened excessive wear on the drive sprocket, pins, bushings and idler wheels will occur.

In a typical conventional endless track arrangement one or more heavy coil springs are assembled to a track frame and held in a preloaded state by fixed stops. An adjustment means, either mechanical or manual hydraulics, is disposed between the preloaded springs and the track idler wheel to take up initial slack in the track linkage and provide for periodical readjustment necessitated by graduated wear of the track elements such as the track links, pins and bushings. When rocks or other obstructions become lodged between the tracks or idler wheels or drive sprockets, the idler wheel moves rearwardly against the pressure of the coil spring until the obstruction has been dislodged and thereupon returns forwardly in response to spring pressure until arrested by the fixed stop. Under field conditions accumulation of rust, dirt, ice and other materials often make it extremely difficult to reset the track tension and also impairs the operation of the recoil spring. Similarly, field disassembly of the mechanism presents considerable danger because of the high spring preload necessary to provide sufficient resistance to recoil.

Accordingly, it is a principal object of the present invention to provide a self-contained track tension adjusting and recoil mechanism employing both yieldable and nonyieldable pressure exerting means associated within a common housing which will eliminate the need for elements such as heavy springs, pumps, and excessive valves and fluid lines.

A further object of the invention is to provide a self-contained track slack adjusting and recoil mechanism in which a compressible solid material is maintained within a recoil housing to yieldably urge forwardly an idler wheel over which an endless track is entrained.

Still another object of the present invention is to provide a self-contained track recoil and adjusting mechanism wherein the tension in the track may be easily adjusted by admission of an incompressible fluid into a variable volume chamber to thereby easily accommodate changing conditions of track wear.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE PREFERRED EMBODIMENT

Figure 1:
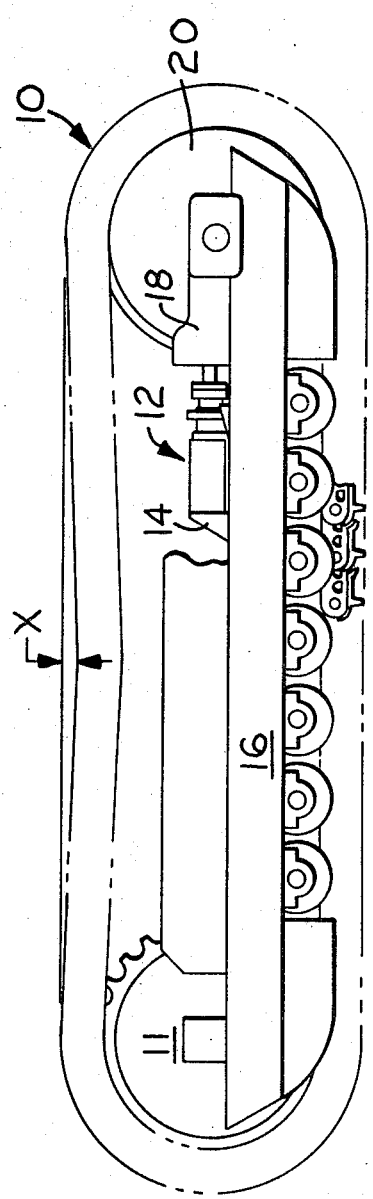
FIG. 1 is a side elevational view of an endless track assembly for a track-type tractor.

In FIG. 1 there is shown a track group generally indicated at 10. The track 10 is suitably trained about a drive sprocket 11 and an idler wheel 20 in a conventional manner. An automatic track adjuster and recoil mechanism for the track group is shown generally at 12. The automatic adjuster mechanism 12 extends between a bracket 14 attached to a track roller frame 16 and a yoke 18 which is slidably mounted on the frame and carries the track idler wheel 20. When the track is properly adjusted, there will be a predetermined amount of slack or sag in the track as indicated at X.

Figure 2:
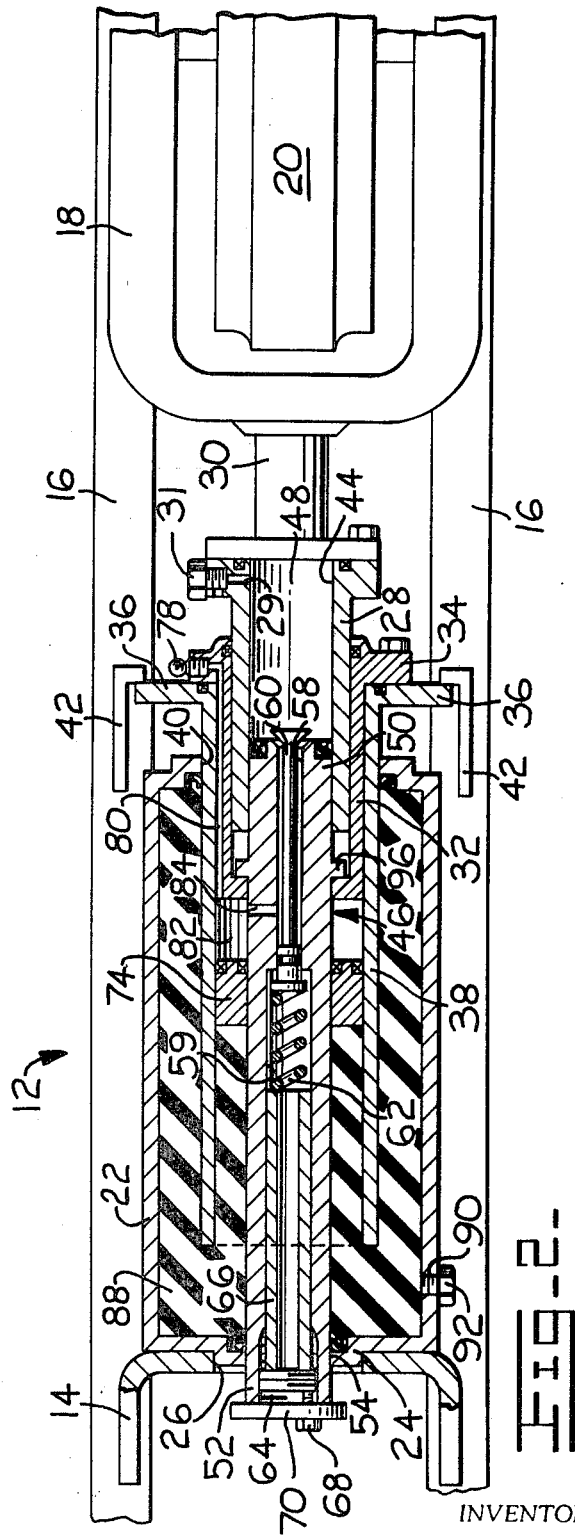
FIG. 2 is an enlarged cross-sectional view of the track-adjusting and recoil mechanism of the present invention.

Referring now to FIG. 2, the automatic track adjuster 12 comprises a cylindrical housing 22 having a projection 24 at one end thereof. The projection 24 of the housing fits inside a bore 26 formed in the bracket 14. An adjuster cylinder 28 extends from the other end of the housing 22 and is attached to a rod 30 which is connected to the yoke 18. The cylinder 28 is provided with a port 29 which is normally closed by a bleed plug 31.

The cylinder 28 is slidably received in a tubular guide 32 having a flange 34 which is secured to a flange 36 formed on a recoil cylinder 38. The recoil cylinder 38 is slidably received in a bore 40 formed in the housing 22. Forward movement of the recoil cylinder 38 is limited by means of stop elements 42 which engage the flanged portion 36 of the recoil cylinder.

The inner wall 44 of the adjuster cylinder 28 is slidably received on an adapter 46 and a variable volume chamber 48 is defined between a first end 50 of the adapter and the closed end of the cylinder 28. A second end 52 of the adapter 46 projects through and is slidably received inside a sealed opening 54 formed in the projection 24 of the housing 22.

The adapter 46 is provided throughout its length with central bores 58 and 59. A movable valve plunger 60 is provided in the bore 58 and a spring 62 in bore 59 normally biases the valve plunger 60 to the open position shown so that the bore 58 communicates with the chamber 48.

The compression of the spring 62 may be adjusted by rotating a nut 64 threadably received in the end 52 of the adapter. Rotation of the nut 64 causes longitudinal movement of a sleeve 66 slidably received in the bore 59 and having one end in contact with the spring 62. The adjusting nut 64 may be locked in a set position by means of an auxiliary bolt 68 which extends through a plate 70 which may also be threadably received on the end 52 of the adapter 46.

A ring-shaped piston 74 is slidably received between the adapter 46 and the recoil cylinder 38. The tubular guide 32 is provided with a fitting 78 which communicates with a passageway 80 formed in the guide and leading to a chamber 82 defined between one end of the guide 32 and one side of the piston 74. The chamber 82 also communicates with the bore 58 of the adapter 46 by means of a port 84 formed in the adapter. It should be understood that a fluid such as grease may be admitted through the fitting 78 into the chamber 82 and then through the port 84 and bore 58 past the valve plunger 60 and into the chamber 48.

The housing 22 contains a compressible material 88, such as a rubber compound which is preferably a silicone rubber and which may be introduced into the housing through a port 90 which is then closed by fill plug 92. The silicone rubber compound 88 is introduced into the housing 22 in a fluid state along with a curing agent which causes the compound to set in the form of a compressible solid. Introduction of the silicone rubber compound 88 into the housing 22 causes the piston 74 to move to the right into engagement with the end of tubular guide 32.

The assembly 12 is now ready for use in adjusting the track 10 so that the desired sag or slack X is established in the track. An incompressible fluid, such as grease, is admitted under pressure through fitting 78 and into passageway 80. The pressure of the grease in passageway 80 causes the piston 74 to move leftwardly enlarging expansible chamber 82 until the grease is free to flow into port 84. The grease then flows into bore 58, past the oven valve plunger 60 and into expansible chamber 48. The admission of grease under pressure into chamber 48 causes the cylinder 28, rod 30 and idler yoke 18 to move rightwardly which increases the tension in the track 10.

The pressure of the grease in chamber 48, necessary to establish the proper sag or slack X in the track 10, can be calculated and the compression load of spring 62 controlling the open condition of the valve plunger 60 can be set accordingly by operation of the nut 64. For exemplary purposes, assume that the pressure in chamber 48 necessary to maintain proper slack X in the track 10 is 2,900 p.s.i. With the spring 62 set for 2,900 p.s.i. in chamber 48, the valve plunger 60 will move leftwardly to a closed position once 2,900 p.s.i. is exceeded in the chamber 48 due to the effective shape of the valve plunger 60. Should it become necessary to drain chamber 48, the bleed plug 31 may be removed.

After the valve is closed additional grease is admitted into the expansible chamber 82 at a higher pressure of, for example, 4,400 p.s.i. This grease in chamber 82 at 4,400 p.s.i. serves as an auxiliary supply for the chamber 48 but will not flow into chamber 48 until the pressure therein drops below 2,900 p.s.i. which would occur when slack producing wear in the track group causes the adjuster cylinder 28 to move rightwardly to reestablish the desired slack X.

The silicone rubber compound 88 contained in the housing 22 acts as a recoil mechanism for the adjuster mechanism in the following manner. Should a rock or other object become lodged between the track 10 and idler 20 or the drive sprocket 11, the yoke 18, rod 30 and cylinder 28 will move leftwardly. The grease in chamber 48 is prevented from escaping since the valve plunger 60 will remain closed and consequently the adapter 46 will move leftwardly. A flange 96 formed on the adapter is in contact with the tubular guide 32 and causes both the guide and recoil cylinder 38 to also move leftward.

In addition, leftward movement of the tubular guide 32 causes leftward movement of the piston 74 since the grease in chamber 82 cannot escape. Thus, any leftward movement of the rod 30 causes all of the components except the housing 22 to move leftwardly as a unit thereby compressing the silicone rubber compound 88 which is enclosed in the housing. After the object becomes dislodged the compressible silicone rubber compound 88 will force the aforementioned components rightwardly into a normal operating position.

While the invention has specifically disclosed the use of a compressible rubber material 88 within the housing 22, it is contemplated that a compressible gas, such as nitrogen, might also be used to provide the recoil force.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. An adjusting mechanism for a machine having an idler wheel over which there is entrained an endless belt, said mechanism mounted on the machine and operatively connected to the idler wheel, said mechanism comprising: a stationary cylindrical housing containing a compressible material; an adapter extending into the housing and having a first end slidably received through a first sealed opening formed in a first end of the housing; a recoil cylinder surrounding the adapter and slidably received through a second sealed opening formed in a second end of the housing; piston means slidably mounted in sealed relation between the adapter and the recoil cylinder; an adjuster cylinder slidably mounted in sealed relation on the second end of the adapter, said adjuster cylinder having a first closed end operatively connected to the idler wheel, said adjuster cylinder having a second end operatively associated with the piston means; a first variable volume chamber defined between the second end of the adapter and the first end of the adjuster cylinder, said first chamber containing an incompressible fluid to prevent movement of the adjuster cylinder toward the adapter; said compressible material in the housing constantly urging movement of the piston means and the adjuster cylinder outwardly of the housing and permitting recoil of the piston means and adjuster cylinder into the housing.

2. The track-adjusting mechanism as set forth in claim 1 and further including a source of auxiliary incompressible fluid operatively associated with the adapter and maintained at a predetermined pressure in excess of the pressure level maintained in the first variable volume chamber; and valve means associated with the adapter, said valve means operable to admit incompressible fluid from the auxiliary source to the first chamber when the pressure in the first chamber drops below a predetermined level.

3. An adjusting mechanism as set forth in claim 2 wherein the valve means is adjustable to vary the pressure level at which fluid is admitted from the auxiliary source to the first chamber.

4. An adjusting mechanism as set forth in claim 3 wherein the source of auxiliary incompressible fluid is maintained in a second variable volume chamber located between the adapter and the recoil cylinder and on the side of the piston which is opposite the compressible material contained in the housing.

5. An adjusting mechanism as set forth in claim 4 wherein the compressible material contained in the housing comprises a silicone rubber compound.

6. An adjusting mechanism as set forth in claim 5 wherein the incompressible fluid comprises grease.

7. An adjusting mechanism as set forth in claim 4 wherein the compressible material comprises nitrogen gas.

* * * * *